United States Patent Office 3,041,261
Patented June 26, 1962

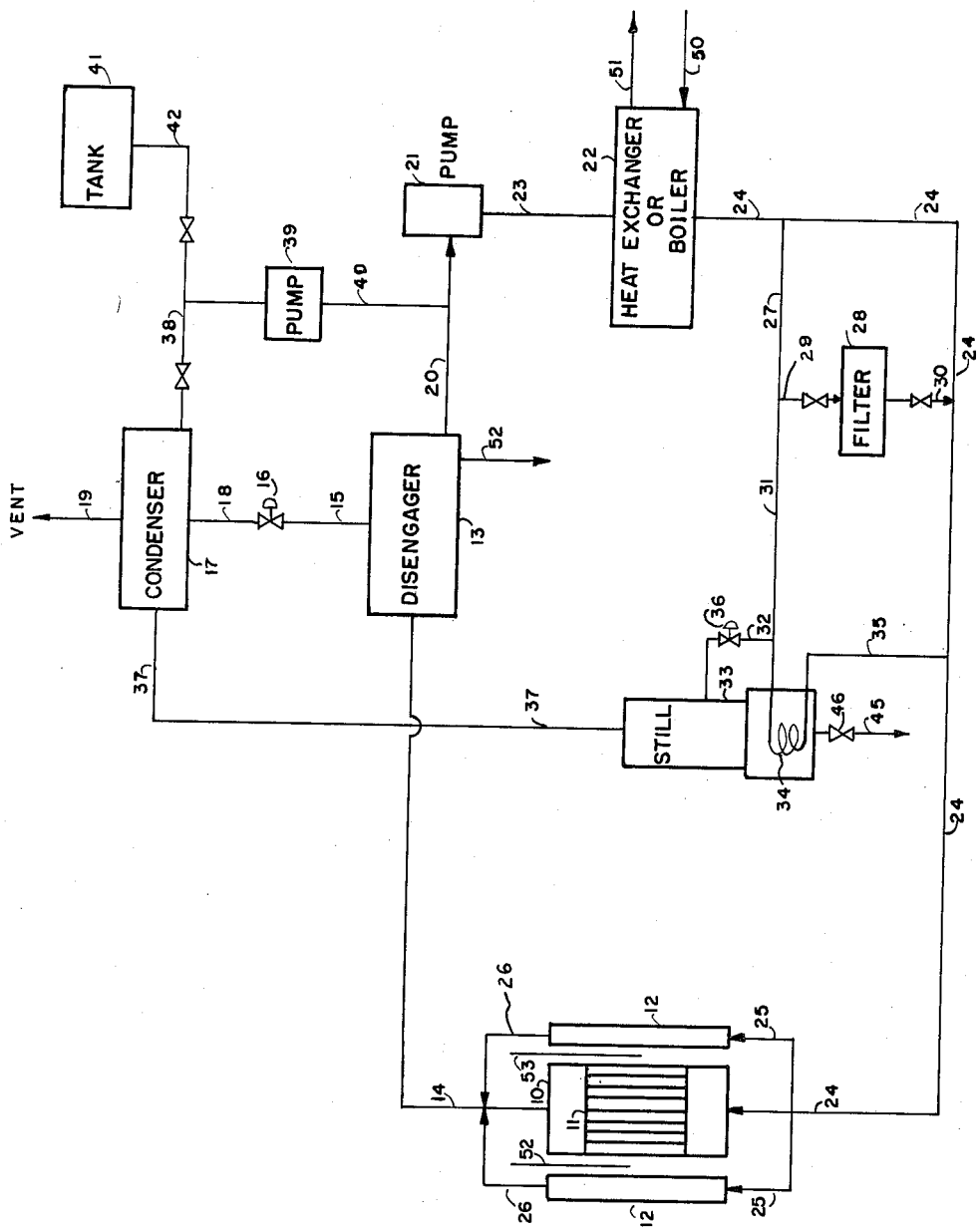

3,041,261
ART OF COOLING AND MODERATING NEUTRONIC REACTORS
Milton Kosmin, Dayton, Ohio, and Malcolm McEwen, Glendale, Mo., assignors, by mesne assignments, to the United States of America as represented by the United States Atomic Energy Commission
Original application June 7, 1956, Ser. No. 590,002, now Patent No. 2,902,425, dated Sept. 1, 1959. Divided and this application Mar. 5, 1959, Ser. No. 797,440
4 Claims. (Cl. 204—154.2)

This invention deals with improvements in the art of cooling and moderating a neutronic reactor. This application is a division of application Serial No. 590,002, filed June 7, 1956, and now U.S. Patent Serial No. 2,902,425.

It has been known for some time that the isotope U–235, occurring in natural uranium to the extent of one part in 139 parts of natural uranium could be fissioned by bombardment wtih thermal neutrons, resulting in the production of two lighter elements having great kinetic energy, together with approximately two fast neutrons on the average together with beta and gamma radiation. Vast amounts of heat energy are liberated in this reaction and the recovery and use of such heat has presented attractive possibilities at a sources of nuclear power.

The practical generation and recovery of the "nuclear or atomic" heat so liberated was, of course, dependent upon the successful solution of the problem of safely inducing and controlling a self-sustaining chain reaction. As is well known to those skilled in this art, this problem was solved by arranging bodies of the fissionable material, usually uranium or enriched uranium, in a geometric pattern within a mass of moderator in such fashion that a self-sustaining controllable chain reaction was obtained. The considerable amounts of heat generated in the bodies of fissionable material were removed by cooling these bodies with either a gas or a suitable liquid. As a result there was developed two general types of neutronic reactors which came to be referred to as "gas-cooled" and "liquid-cooled" reactors.

For the purpose of recovering the heat liberated by the fissioned chain reaction and utilizing such heat in a heat engine of conventional type, the liquid-cooled reactor has received the greatest attention and it is with this type of reactor that this invention is concerned.

Methods for constructing and operating neutronic reactors for carrying out the chain reaction are well known in this art and are described, for example, by Fermi and Szilard in U.S. Patent No. 2,708,656, issued May 17, 1955. This patent is by reference incorporated herein and made a part of this disclosure. According to the disclosure of this patent, either light water, $H_2O$, heavy water, $D_2O$, or diphenyl (biphenyl) may be used as a moderator and coolant in the liquid-cooled reactor.

Attractive possibilities are presented by the use of biphenyl as a reactor coolant. The properties of this material, i.e., its relatively high boiling point at atmospheric pressure (255° C.), its chemical composition consisting only of carbon and hydrogen, and its thermal stability make possible the operation of reactors cooled with this material at temperatures as high as 425° C., or higher, for extended periods of time. A major drawback encountered in the use of this material lies in its relatively high freezing point (70° C.) and the fact that some polymerization takes place in the biphenyl as a result of radiolytic damage.

We have now found that monoisopropylbiphenyl can be used as a reactor moderator and coolant in place of, or in admixture with, biphenyl (employing in such mixture, however, not in excess of 20% by weight of biphenyl) and all of the advantages hitherto obtained by the use of biphenyl are realized but in greater degree and without encountering the difficulties attendant upon the use of a material of high freezing point.

*Induced Radioactivity and Control Thereof*

Any organic liquid used as a moderator in a neutronic reactor, even though composed exclusively of carbon and hydrogen, will acquire some radioactivity. However, this will generally be of a very low intensity. Liquids which are circulated through welded steel equipment will pick up contaminants, such as iron scale or flux residues, which subsequently acquire more intense activity upon exposure to radiation. Contaminants can usually be removed by simple filtration. It is, accordingly, desirable to insert a simple filter at some point in the circulating fluid, by means of which a small portion of the liquid is continuously filtered and the clean filtrate returned to the system.

We have found that certain hydrocarbon fractions have a pronounced ability to remove scale and flux residues from iron and steel surfaces. A fluid which has an especially high descaling and cleaning property is made by hydrogenating the normally solid hydrocarbons boiling above 350° C. at 760 mm. pressure, which are formed during the synthesis of biphenyl from benzene by pyrolysis at elevated temperatures. Such hydrocarbon liquids are more fully described in Jenkins Patent 2,364,-719, issued December 12, 1944. The material described in said patent is referred to herein as HB–40.

The pronounced descaling and cleaning effect on steel equipment was shown in two tests in which the effectiveness of biphenyl and HB–40 were compared. In the first test the interior of a welded steel tubular loop was first cleaned and descaled, using hot caustic soda solution. It was then further cleaned by circulating hot biphenyl through the loop for a few hours and then replacing the contaminated biphenyl with successive fillings of biphenyl until the latter showed no further visible amounts of scale. The loop was then inserted into the neutronic reactor and exposed to neutron radiation. Radiation activity tests were made on samples of biphenyl removed from the loop. These samples showed an activity of 0.45 micro-curie per gram after a few hours of exposure to the radiation. The biphenyl was retained in the loop for over 100 hours without evidencing any increase in activity above that originally measured.

After removal of the biphenyl from the loop and while the latter was still in the reactor it was filled with HB–40 and the exposure to radiation continued. Samples taken from the material in the loop showed an activity of 4.0 microcuries per gram of material. By simple filtration of the sample the activity of the filtrate was reduced to 0.4 microcurie per gram.

The present discovery affords a simple and convenient method for removing contaminating scale and impurities from steel or iron systems for any purpose and particularly those which are to be exposed to neutron radiation. It is generally necessary only to fill the system with the liquid HB–40 and circulate the same at a temperature above 100° C. and preferably below 300° C. for a number of hours. The liquid is then removed from the system, filtered and returned to the system for further cleaning. This treatment removes contaminants from the system about 10 times as effectively as does biphenyl.

After the system had been cleaned, as described above, it was filled with isopropylbiphenyl, the system irradiated by means of fast neutrons and a sample withdrawn for test. The induced radioctivity of the isopropylbiphenyl was only 0.11 microcurie per gram.

Use of Isoprophylbiphenyl as a Moderator and Coolant in a Power Reactor

A typical power reactor is illustrated diagrammatically in the flow sheet shown in the accompanying drawing:

In the drawing, numeral 10 indicates a cylindrical reactor shell constructed preferably of steel. Within the shell 10 is arranged a reactor core 11, which consists of plates of enriched uranium of such number, size, shape and composition as to be capable of becoming critical upon the addition of the isopropylbiphenyl. Surrounding the cylindrical shell 10 is a cylindrical reflector shell 12, which is also constructed of steel and which contains liquid reflector material. In the reactor core are inserted the usual control systems, indicated by numerals 52 and 53, the construction of which and use thereof being described in the Fermi et al patent, referred to above.

Numeral 13 indicates a disengager or gas trap, which is merely a device for separating gas from liquid. The disengager is connected with the reactor shell 10 by pipe 14. The gas which is separated from the liquid coolant in 13 flows out by means of pipe 15, connected to pressure controller 16, which in turn is connected to condenser 17 by pipe line 18. Condenser 18 carries a discharge line or vent 19, permitting the discharge of gases to the atmosphere.

Liquid coolant flows from disengager 13 through line 20 into pump 21 by means of which the coolant is circirculated into and through heat exchanger or boiler 22 via line 23. Leaving heat exchanger 22 by pipe 24 the coolant, now reduced in temperature, is returned to reactor shell 10 by line 24. Branch lines 25 carry the coolant into reflector shell 12 and thence by pipe 26 back into the main stream flowing into pipe 14.

Pipe line 27 carries a small stream of coolant from pipe 24 either into filter 28 via pipe 29, thence returning the flow of filtrate by pipe 30 to the main stream flowing in pipe 24, or by means of pipes 31 and 32 into purification still 33. Heating coil 34 in the reboiler section of still 33 provides the necessary heat for distillation, the liquid returning thence to pipe 24 by means of pipe 35.

Liquid coolant which is fed to still 33 flows through pipe 32 and enters the still first passing pressure reducing valve 36, by which means the flow is controlled to that required to keep the high boiling components at the desired level. Still 33 may operate at substantially atmospheric pressure. The distillate in vapor form leaves the still by pipe 37 entering condenser 17, where the vapors are liquefied, the liquid resulting therefrom flowing through pipe 38 into pump 39 and being thereby returned to pipe 40 to the main stream flowing in pipe 20. Make-up liquid coolant is introduced into tank 41 and flows by pipe 42 into pipe 38 and thence into pump 39.

Purification still 33 may be operated continuously or intermittently as desired. It is, of course, desirable to keep the high boiling decomposition products in the circulating liquid as low as possible in view of the adverse effects of these products on viscosity and heat transfer. Small amounts of such high boiling decomposition products usually in the neighborhood of 5–10% by weight of the liquid may be tolerated without a substantial decrease in the heat transfer coefficient. After the high boiler content has reached a predetermined value (as determined by distillation of the sample) the purification still is placed in operation and a constant stream of coolant withdrawn from the system into the still 33 where it is distilled. The distillate passes into condenser 17, where it is condensed and then returned to the system by means of pump 39 as above described. The high boilers are removed from still 33 by means of pipe 45 containing valve 46 and thenceforth discharded.

Heat energy is withdrawn from the liquid coolant circulating in the heat exchanger or boiler 22 in any manner desired. In one method of operation, boiler feed water is introduced by means of pipe 50 and steam generated under pressure within boiler 22 being withdrawn at pipe 51 and supplied to a steam turbine or other prime mover. The condensate produced in the conventional condenser forming part of the prime mover will again be returned to the boiler. It is, of course, not necessary that water be used, since any thermally stable organic liquid of high boiling point may serve the same purpose and obviate the hazards encountered with accidental leakage of water into the coolant-moderator system. The further utilization of the energy obtained in this manner from a nuclear reactor is well known to those skilled in the art and forms no part of the present invention.

In order to start up a newly constructed system, it is first cleaned out by conventional descaling agents and then treated by introducing HB–40 fluid into supply tank 41 in amounts sufficient to fill the entire system. Pump 21 is placed in operation and circulation is maintained for several hours, the liquid withdrawn and visually examined for cleanliness. The fluid should be filtered if contaminated and reintroduced into the system and this procedure repeated several times until clear. The HB–40 is then completely withdrawn and the system filled with an inert gas such as nitrogen or helium, so as to eliminate traces of air and moisture pending the introduction of the isopropylbiphenyl charge.

The clean system is now loaded with isopropylbiphenyl by introduction to supply tank 41, from which point it is permitted to flow into and through the pipe lines and various pieces of equipment completely filling the same with the exception of still 33 and condenser 17 which are not filled. The system is filled to the point where the disengager is approximately one half full. Pump 21 is activated, the control devices in the reactor adjusted to release power in such an amount as to raise the temperature of the isopropylbiphenyl in the system to a temperature between 400 and 425° C. Heat is extracted from the heat exchanger or boiler in the manner described above and a point of heat supply from the reactor and removal at the boiler reached at which these quantities are substantially in balance.

Radiolytic damage to the fluid is evidenced by the accumulation of fixed gases in disengager 13 and also by the formation of high boiling hydrocarbons in the liquid. The fixed gases consist of a mixture of approximately equal volumes of hydrogen and lower hydrocarbons. As the amount of fixed gas increases in the closed system, the pressure rises to the desired value, after which it is continuously or intermittently withdrawn through pressure control valve 16. Withdrawal of gas is maintained at such a rate so as to maintain the system under a pressure which is sufficiently high so as to prevent vapor formation in the hottest part of the system. This hottest part of the system is adjacent to the fuel elemens in reacor 11. Decrease of density occurring as a result of increase in temperature will result in some loss of moderation by reason of the fewer hydrogen atoms per unit volume of coolant. Such decrease in moderation will, to some extent, damp out the nuclear reaction and can be compensated by adjustment of control devices. At all events, it is necessary to maintain the gas pressure on the system sufficiently high so that vapor formation will not occur.

The discharge of fixed gases attending the maintenance and the regulation of pressure upon the system will carry out some isopropylbiphenyl in vapor form. In order to recover such isopropylbiphenyl the gases are discharged into condenser 17, wherein they are cooled by contact with cooled surfaces maintained at a low temperature by means of cooling water. Condensed liquid isopropylbiphenyl will be returned to pipe 38, the valve therein now being opened into the suction side of pump 39 and thence returned to the circulating system.

The high boiling tar-like material formed concomitantly with the gases by the effect of radiation should also be removed or maintained at a desirably low level. This is done by the withdrawal via lines 27, 31 and 32 and reducing valve 36 of a constant stream of liquid flowing to still 33. Still 33 operates under substantially atmospheric pressure as a result of which the contents can be boiled by means of a side stream of fluid passing to heating coil 34, located within the reboiling zone of still 33. The distillate leaving the still passes by line 37 also into condenser 17. The condensate is mixed with that derived from the disengager discharge vapors and is then returned by pump 39 to the system.

Removal of solid particles from the interior walls of the system which become suspended in and carried by the circulating liquid is best done by the provision of a filter 28 located in the system as shown in the drawing. Such filter is supplied by lines 29 and the filtrate returned by line 30 again to the system. The pressure drop across the filter may be overcome by means of a suitable pump installed in either of these lines. By this means the induced radioactivity in the suspended foreign materials in the circulating fluid can be maintained at a low value.

The descaling and cleaning properties, upon steel surfaces, of hydrogenated polyphenyls (HB–40) is utilized for the purpose of preparing the interior of circulating systems in neutronic reactors for use with liquid organic moderators, leading to greatly reduced radioactivity in such liquids.

What we claim is:

1. The method for decreasing the induced radioactivity in a hydrocarbon liquid coolant and moderator enclosed within steel equipment, wherein said hydrocarbon liquid is subjected to high neutron flux, which comprises cleaning the interior surfaces of said steel by contacting the same at a temperature between 100° and 300° C. for a number of hours with liquid hydrogenated polyphenyl producible by hydrogenating the normally solid hydrocarbons boiling above 350° C. at 760 mm. pressure and which are formed during synthesis of biphenyl from benzene by pyrolysis at elevated temperatures, removing the liquid hydrogenated polyphenyl from contact with said steel and filtering the liquid hydrogenated polyphenyl to remove suspended matter and make it suitable for reuse, and thereafter flowing said hydrocarbon through said steel equipment in the presence of a high neutron flux.

2. The method for decreasing the induced radioactivity in a hydrocarbon liquid moderator enclosed within steel equipment, wherein said hydrocarbon liquid is subjected to high neutron flux, which comprises cleaning the interior surfaces of said steel by contacting the same at a temperature between 100° and 300° C. for a number of hours with liquid hydrogenated polyphenyl producible by hydrogenating the normally solid hydrocarbons boiling above 350° C. at 760 mm. pressure and which are formed during synthesis of biphenyl from benzene by pyrolysis at elevated temperatures, removing the liquid hydrogenated polyphenyl from contact with said steel and filtering the liquid hydrogenated polyphenyl to remove suspended matter and make it suitable for reuse, and thereafter flowing said hydrocarbon through said steel equipment in the presence of a high neutron flux.

3. The method for decreasing the induced radioactivity in a hydrocarbon liquid coolant enclosed within steel equipment, wherein said hydrocarbon liquid is subjected to high neutron flux, which comprises cleaning the interior surfaces of said steel by contacting the same at a temperature between 100° and 300° C. for a number of hours with liquid hydrogenated polyphenyl producible by hydrogenating the normally solid hydrocarbons boiling above 350° C. at 760 mm. pressure and which are formed during synthesis of biphenyl from benzene by pyrolysis at elevated temperatures, removing the liquid hydrogenated polyphenyl from contact with said steel and filtering the liquid hydrogenated polyphenyl to remove suspended matter and make it suitable for reuse, and thereafter flowing said hydrocarbon through said steel equipment in the presence of a high neutron flux.

4. The method for decreasing the induced radioactivity in a hydrocarbon liquid coolant consisting of isopropylbiphenyl and mixtures of isopropylbiphenyl and biphenyl enclosed within steel equipment, wherein said hydrocarbon liquid coolant is subjected to high neutron flux, which comprises cleaning the surfaces exposed to said coolant, by contacting the same at a temperature between 100° and 300° C. for a number of hours with liquid hydrogenated polyphenyl producible by hydrogenating the normally solid hydrocarbons boiling above 350° C. at 760 mm. pressure and which are formed during synthesis of biphenyl from benzene by pyrolysis at elevated temperatures, removing the liquid hydrogenated polyphenyl from contact with said steel and filtering the liquid hydrogenated polyphenyl to remove suspended matter and make it suitable for reuse, and thereafter flowing said hydrocarbon through said steel equipment in the presence of a high neutron flux.

References Cited in the file of this patent

UNITED STATES PATENTS 2,364,719    Jenkins _____ Dec. 12, 1944

OTHER REFERENCES

Nucleonics, vol, #5, November 1951, pp. C12–C15.